(12) United States Patent
Ferman et al.

(10) Patent No.: US 8,223,395 B2
(45) Date of Patent: Jul. 17, 2012

(54) METHODS AND SYSTEMS FOR REFINING TEXT COLOR IN A DIGITAL IMAGE

(75) Inventors: Ahmet Mufit Ferman, Vancouver, WA (US); John E. Dolan, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1370 days.

(21) Appl. No.: 11/781,144

(22) Filed: Jul. 20, 2007

(65) Prior Publication Data

US 2009/0021753 A1   Jan. 22, 2009

(51) Int. Cl.
  G06K 1/00    (2006.01)
  G06K 15/00   (2006.01)
  G06K 9/00    (2006.01)
  H04N 1/409   (2006.01)
  H04N 1/46    (2006.01)
  G06T 15/50   (2011.01)

(52) U.S. Cl. ......... 358/1.9; 358/2.1; 358/3.27; 358/462; 358/464; 358/534; 382/187; 382/199; 382/218; 345/426

(58) Field of Classification Search .......... 358/1.9, 358/2.1, 3.06, 3.27, 462, 464, 534; 382/162, 382/164, 165, 168, 173, 176, 180, 181, 182, 382/187, 189, 199, 202, 205, 218, 219, 220, 382/224, 225, 266, 272; 345/426
See application file for complete search history.

(56) References Cited

U.S. PATENT DOCUMENTS

| | | |
|---|---|---|
| 6,999,616 B2 | 2/2006 | Nacken |
| 7,016,536 B1 | 3/2006 | Ling |
| 7,330,600 B2 | 2/2008 | Nishida |
| 2004/0146200 A1 | 7/2004 | Andel |
| 2004/0146216 A1 | 7/2004 | Andel |
| 2005/0244060 A1 | 11/2005 | Nagarajan |
| 2006/0062454 A1* | 3/2006 | Fan et al. ............ 382/164 |
| 2008/0130064 A1* | 6/2008 | Sato ................... 358/474 |

FOREIGN PATENT DOCUMENTS

| | | |
|---|---|---|
| EP | 961218 A1 | 12/1999 |
| JP | 05-316343 A | 11/1993 |

(Continued)

OTHER PUBLICATIONS

Japanese Office Action—Patent Application No. 2008-187775—Mailing Date Mar. 16, 2010.

*Primary Examiner* — Thomas Lett
(74) *Attorney, Agent, or Firm* — Kristine Elizabeth Matthews; David C. Ripma

(57) ABSTRACT

Aspects of the present invention relate to systems and methods for refining text color in a digital image. A pixel of interest from a first plurality of pixels in a digital image may be selected, and the first plurality of pixels may be separated into a second plurality of pixels and a third plurality of pixels based on the color value of the pixel of interest. A refinement color value may be calculated based on the second plurality of pixels when the second plurality of pixels meets a quantity threshold. When the second plurality of pixels does not meet the quantity threshold, the refinement color value may be calculated based on the third plurality of pixels. The refinement color value may be assigned to the pixel of interest.

23 Claims, 4 Drawing Sheets

FOREIGN PATENT DOCUMENTS

| | | |
|---|---|---|
| JP | 06-339028 A | 12/1994 |
| JP | 08-307666 A | 11/1996 |
| JP | 10-232926 A | 9/1998 |
| JP | 11-136505 A | 5/1999 |
| JP | 2000-048120 A | 2/2000 |
| JP | 2000-357226 A | 12/2000 |
| JP | 2002-117400 A | 4/2002 |
| JP | 2002-118751 A | 4/2002 |
| JP | 2004/153298 A | 5/2004 |

* cited by examiner

METHODS AND SYSTEMS FOR REFINING TEXT COLOR IN A DIGITAL IMAGE

FIELD OF THE INVENTION

Embodiments of the present invention comprise methods and systems for refining text color in a digital image.

BACKGROUND

The content of a digital image may have considerable impact on the compression of the digital image, both in terms of compression efficiency and compression artifacts. Pictorial regions in an image may not be efficiently compressed using compression algorithms designed for the compression of text. Similarly, text images may not be efficiently compressed using compression algorithms that are designed and optimized for pictorial content. Not only may compression efficiency be affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers, scanners and other imaging devices may use text segmentation when performing content-specific processing and compression on document, and other digital, images. Exemplary content-specific processing may comprise differential filtering and color enhancement. Exemplary content-specific compression may comprise layered compression schemes, where the contents of a document image are segmented into a high-resolution foreground layer and a lower resolution background.

Detection of text in digital images may be used so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content.

SUMMARY

Some embodiments of the present invention comprise methods and systems for deriving a refinement color value for a pixel based on neighboring pixel values.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a drawing showing an examination window comprising text pixels and non-text pixels;

FIG. 2. is a chart showing embodiments of the present invention comprising derivation of a replacement color value from color values classified as similar to the color value of an examination pixel;

DETAILED DESCRIPTION OF EXEMPLARY EMBODIMENTS

Figure 1:
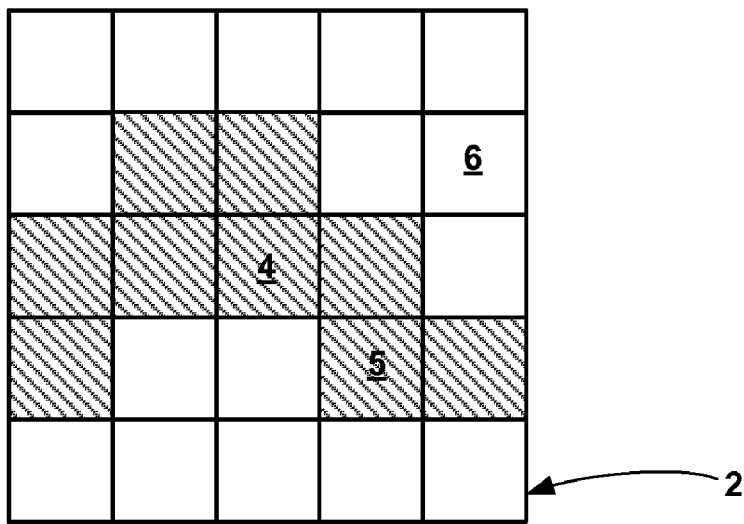

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

The content of a digital image may have considerable impact on the compression of the digital image, both in terms of compression efficiency and compression artifacts. Pictorial regions in an image may not be efficiently compressed using compression algorithms designed for the compression of text. Similarly, text images may not be efficiently compressed using compression algorithms that are designed and optimized for pictorial content. Not only may compression efficiency be affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers, scanners and other imaging devices may use text segmentation when performing content-specific processing and compression on document, and other digital, images. Exemplary content-specific processing may comprise differential filtering and color enhancement. Exemplary content-specific compression may comprise layered compression schemes, where the contents of a document image are segmented into a high-resolution foreground layer and a lower resolution background.

Detection of text in digital images may be used so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content.

Text segmentation algorithms may identify textual content in an image. A text map may indicate which pixels in an image may correspond to text pixels. In some embodiments of the present invention, a text map may be a binary image, array or other data structure, in which the binary value of a pixel at a location in the text map may indicate whether or not the corresponding pixel in the image data may be part of a text character. The color value of the corresponding pixel in the image data may be referred to as the text-pixel color value or the non-text-pixel color value according to the binary value.

In alternative embodiments of the present invention, a text map may be a multi-valued image, array or other data structure, in which the value of a pixel at a location in the text map may indicate a certainty measure for the corresponding pixel in the image data. The certainty measure may indicate the membership value of the pixel in the text class. A text pixel may refer to a pixel with a text-map value in particular relationship to a threshold. The color value of the corresponding pixel in the image data may be referred to as the text-pixel color value.

Associated with a text pixel may be a text color. Noise and other artifacts may be introduced into a document image during a scanning processing which may result in color variations in connected pixels that constitute a single character, as well as in neighboring characters within a text block. Some embodiments of the present invention comprise methods and systems for reducing such fluctuations in text color.

In some embodiments of the present invention, a plurality of text-map pixels in a window centered around a pixel of interest may be examined. FIG. 1 shows an exemplary window 2 in a text map with text-map pixels centered around a center pixel 4. The center pixel 4 may be referred to as a pixel of interest or the examination pixel. For a binary text-map, a pixel in the window 2 may have a first value indicating that the pixel belongs to the text class. For example, a shaded pixel (of which 4 and 5 are exemplary), may indicate that the pixel is a text pixel. While an un-shaded pixel (of which 6 is exemplary), may indicate that the pixel is not a text pixel.

Figure 2:
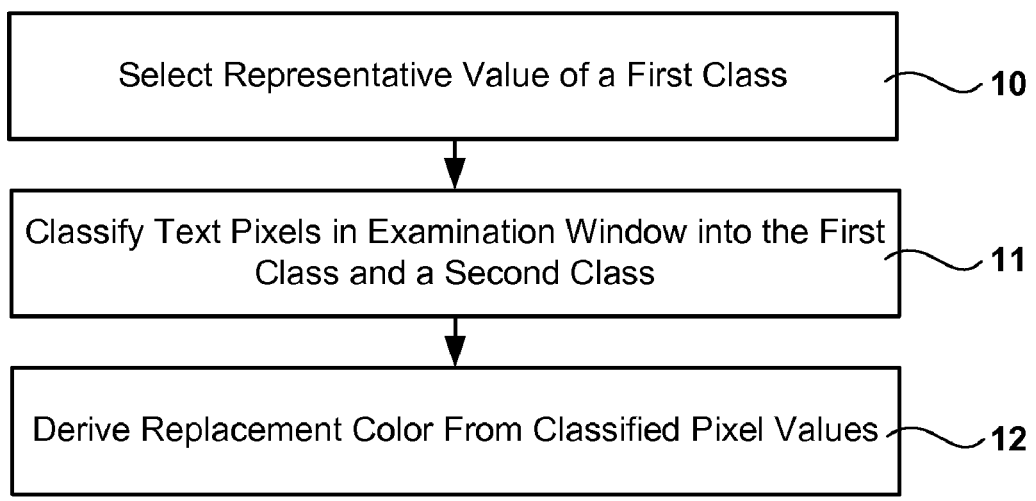

In some embodiments of the present invention, a refinement color value, also considered a replacement color value, for a text pixel of interest may be determined by examining the pixels in an examination window surrounding the text pixel of interest. In these embodiments, described in relation to FIG. 2, a color value representing a first color class may be selected 10. Each text pixel in the examination window may be classified 11 into the first class or a second class based on the similarity between the color value of the text pixel and the representative color value for the first class. The refinement color value for the text pixel of interest may be derived 12 based on the color values of the pixels in each of the two classes.

Pixel color values may comprise a color representation in any color space including, but not limited to, RGB, sRGB, CMYK, YUV, YIQ, YCbCr, YPbPr, HSV, HSL, Lab and L*a*b*.

In some embodiments of the present invention, color similarity may be measured according to:

$$\frac{\alpha|A_i - A_{rep}| + \beta|B_i - B_{rep}| + \gamma|C_i - C_{rep}|}{\alpha + \beta + \gamma},$$

where $(A_i, B_i, C_i)$ may be the color-component values for the ith text pixel in the examination window, $(A_{rep}, B_{rep}, C_{rep})$ may be the color-component values for the representative color value of the first class and $(\alpha, \beta, \gamma)$ may be weights associated with each color component. The contribution of each color component to the similarity measure may be controlled by the weights $(\alpha, \beta, \gamma)$.

In alternative embodiments of the present invention, color similarity may be measured using a distance measurement between the text pixel color and the representative color. Exemplary color-distance measures may comprise an $L_1$ norm, an $L_2$ norm, a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

Figure 3:
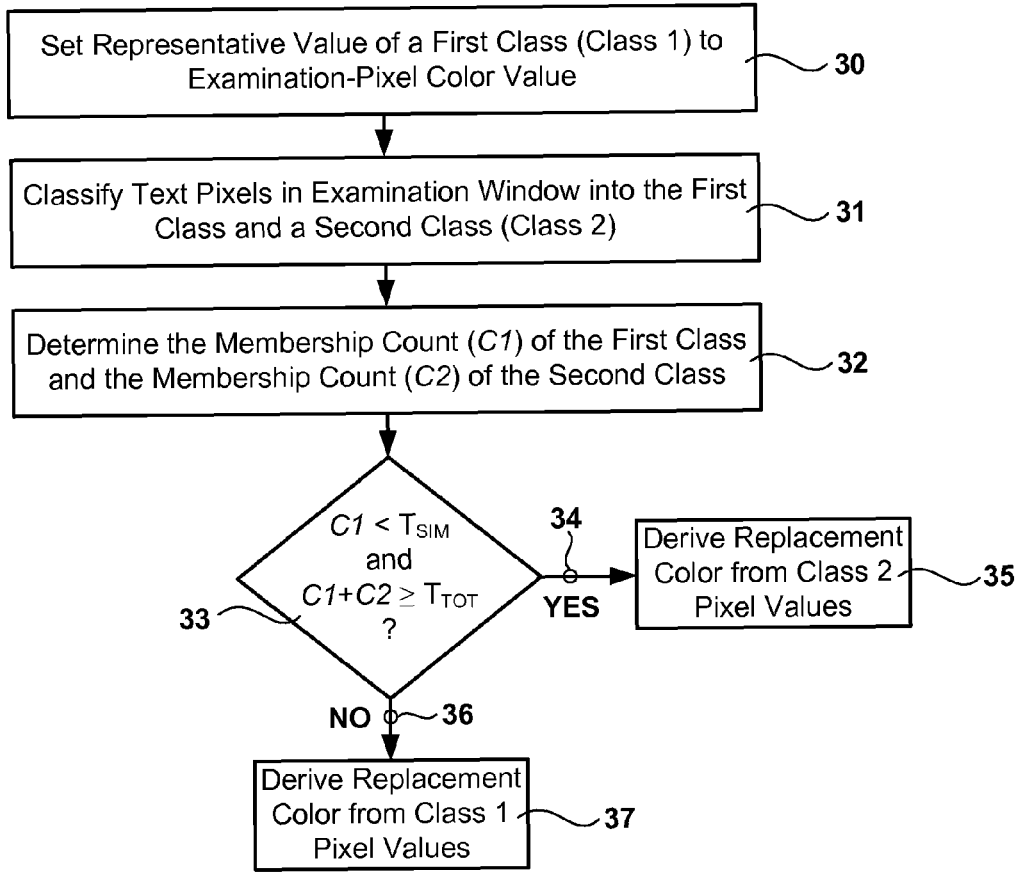
FIG. 3 is a chart showing embodiments of the present invention comprising derivation of a replacement color value from color values classified as similar to the color value of an examination pixel when a sufficient number of pixels may be classified as similar to the color value of the examination pixel.

Some embodiments of the present invention may be described in relation to FIG. 3. In these embodiments, the representative color value for the first class may be set 30 to the color value of the text pixel of interest. Text pixels classified 31 as belonging to the first class may comprise text pixels with color values substantially similar to the color value of the text pixel of interest. Text pixels classified 31 as belonging to the second class may comprise text pixels with color values substantially dissimilar to the color value of the text pixel of interest. Color classification 31 may comprise comparing the similarity measure to a predetermined threshold. The membership count in the each of the two classes may be determined 32. Based on the membership counts 33, the replacement color value for the text pixel of interest may be determined from the color values of the text pixels in the first class 37 or the second class 35.

In some embodiments of the present invention, the replacement color value may be derived from the color values of the pixels in the first class 37 when the condition (C1<Tsim and C1+C2≧Ttot), where C1 and C2 may be the membership counts of the first class and the second class, respectively, and Tsim may be a first threshold and Ttot may be a second threshold, may be satisfied 36. The replacement color value may be derived from the color values of the pixels in the second class 35 when this condition is not satisfied 34.

In some embodiments of the present invention, the replacement color value, denoted $(\omega_A, \omega_B, \omega_C)$, may be derived from the color values of the pixels in the first class 37 according to:

$$\omega_A = \frac{1}{C1} \sum_{i \in class1} A_i, \quad \omega_B = \frac{1}{C1} \sum_{i \in class1} B_i, \quad \omega_C = \frac{1}{C1} \sum_{i \in class1} C_i.$$

The replace color value may be derived from the color values of the pixels in the second class 35 according to:

$$\omega_A = \frac{1}{C2} \sum_{i \in class2} A_i, \omega_B = \frac{1}{C2} \sum_{i \in class2} B_i, \omega_C = \frac{1}{C2} \sum_{i \in class2} C_i.$$

In alternative embodiments, the replacement color value may be the class median color value.

In alternative embodiments of the present invention, the color value for all text pixels within the examination window may be updated to the replacement color value. In still alternative embodiments, the color value for all text pixels within the examination window and within the first class may be updated to the replacement color value.

Figure 4:
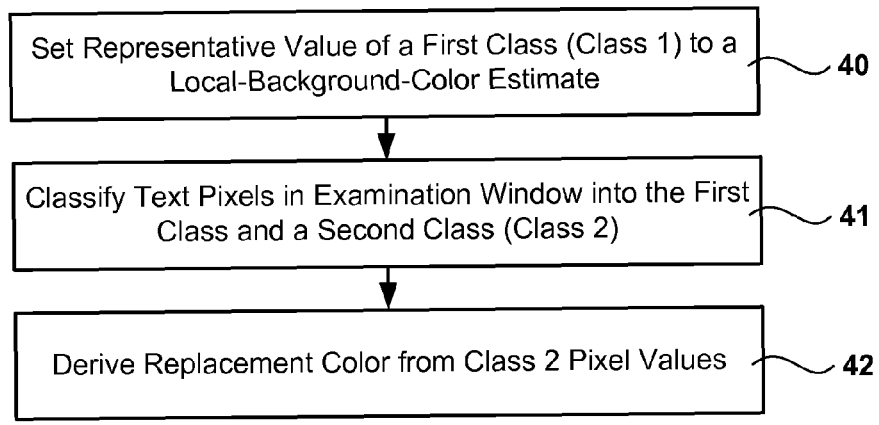
FIG. 4 is a chart showing embodiments of the present invention comprising derivation of a replacement color value from color values classified as dissimilar to a background-color estimate.

In some embodiments of the present invention, a local-background-color estimate may be used in the color refinement process. These embodiments may be described in relation to FIG. 4. In some embodiments of the present invention, a refinement color value, also considered a replacement color value, for a text pixel of interest may be determined by examining the pixels in an examination window surrounding the text pixel of interest. In these embodiments, a color value representing a first color class may be set to a local-background-color estimate 40. The text pixels in an examination window may be classified into the first class and a second class 41. The classification 41 may be based on the similarity of the text pixel color value to the representative color value. Similarity may be determined by methods described above. The replacement, or refinement, color value may be derived 42 from the color values text pixels classified into the second class. In some embodiments, the color value of the text pixel of interest around which the examination window is centered may be updated to the replacement color value. In alternative embodiments, the color value of all text pixels within the examination window may be updated to the replacement color value. In still alternative embodiments, the color value for all text pixels within the examination window that are also in the second class may be updated to the replacement color value.

Figure 5:
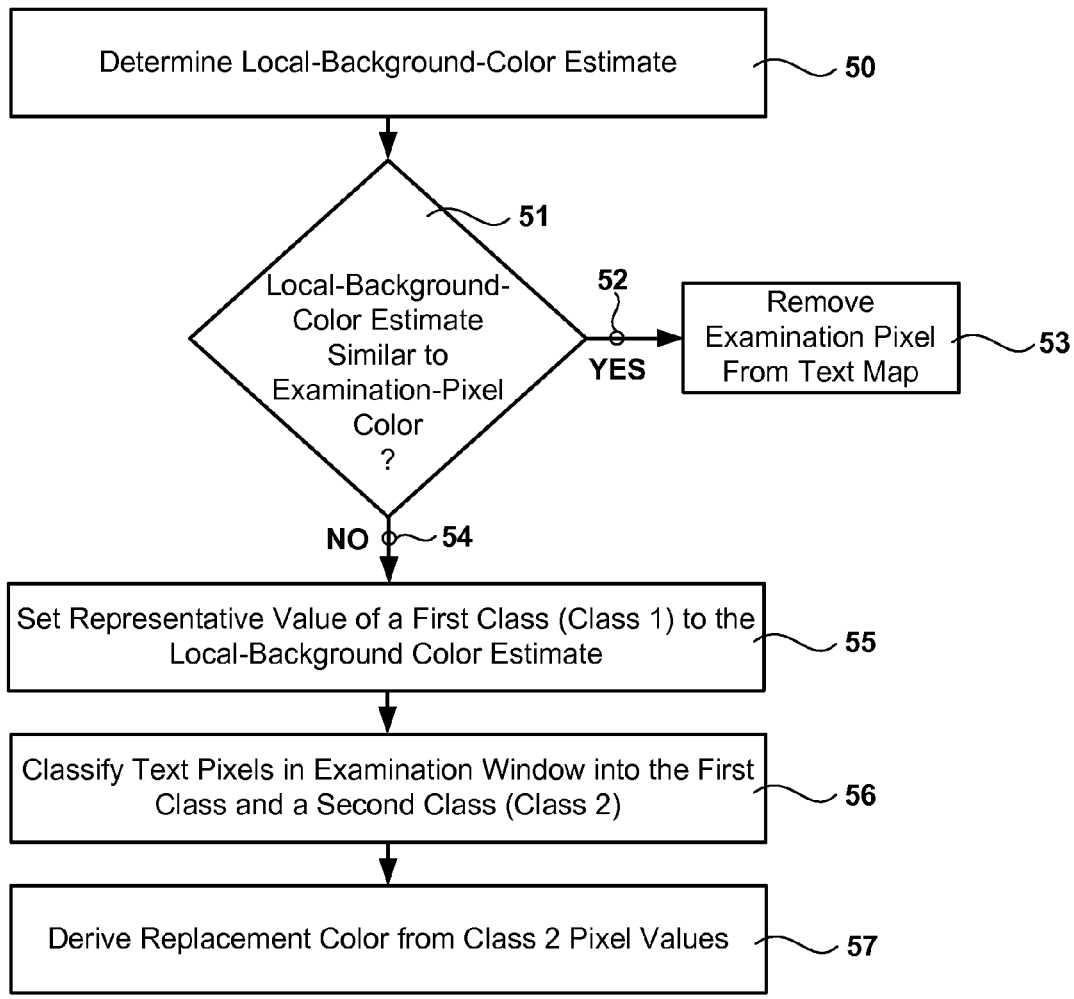
FIG. 5 is a chart showing embodiments of the present invention comprising removing a pixel of interest from a text map when the color value of the pixel of interest is similar to a background-color estimate.

In some embodiments of the present invention, if the color value of the text pixel of interest is substantially similar to the local-background-color estimate, then the text pixel may be removed from the text map. These embodiments may be described in relation to FIG. 5. A local-background-color estimate may be determined 50. The local-background-color estimate may be provided as the result of foreground/background, or other processing, in a processing pipeline. In the absence of a preprocessing module that explicitly provides the local-background-color estimate, the local-background-color estimate may be determined from the color values of the pixels within the examination window. In some embodiments, the local-background-color estimate may comprise the mean, median, trimmed mean, or other combination, of the color values of the non-text pixels. The local-background-color estimate may be propagated from examination window to examination window, and the propagated color value used if all of the pixels within an examination window are text pixels. The examination pixel color value may be compared to the local-background-color estimate 51, and if the examination pixel color value is substantially similar to the local-background-color estimate 52, then the examination pixel may be removed from the text map 53. If the examination pixel color value is not substantially similar to the local-background-color estimate 54, then the local-background-color estimate may be selected 55 as the representative color value of a first color class. The text pixels in the examination window may be classified 56 into the first class and a second class. The similarity of the local-background-color estimate and a text pixel color value may be used to classify 56 the text pixel. The replacement color value may be derived from the color values of the text pixels classified in the second class 57. The replacement color value may be the mean, trimmed mean, median, or other combination of the color values of the text pixels in the second class. In alternative embodiments, the replacement color value may be the color value from the second class pixels that is maximally dissimilar to the background-color-estimate.

In alternative embodiments of the present invention, the color value for all text pixels within the examination window may be updated to the replacement color value. In alternative embodiments, the color value for all text pixels within the examination window that are also in the second class may be updated to the replacement color value.

In some embodiments of the present invention, a refinement color value, also considered a replacement color value, for a pixel of interest may be determined by examining the pixels in an examination window surrounding the pixel of interest. In these embodiments, all of the pixels in an examination window may be examined.

Figure 6:
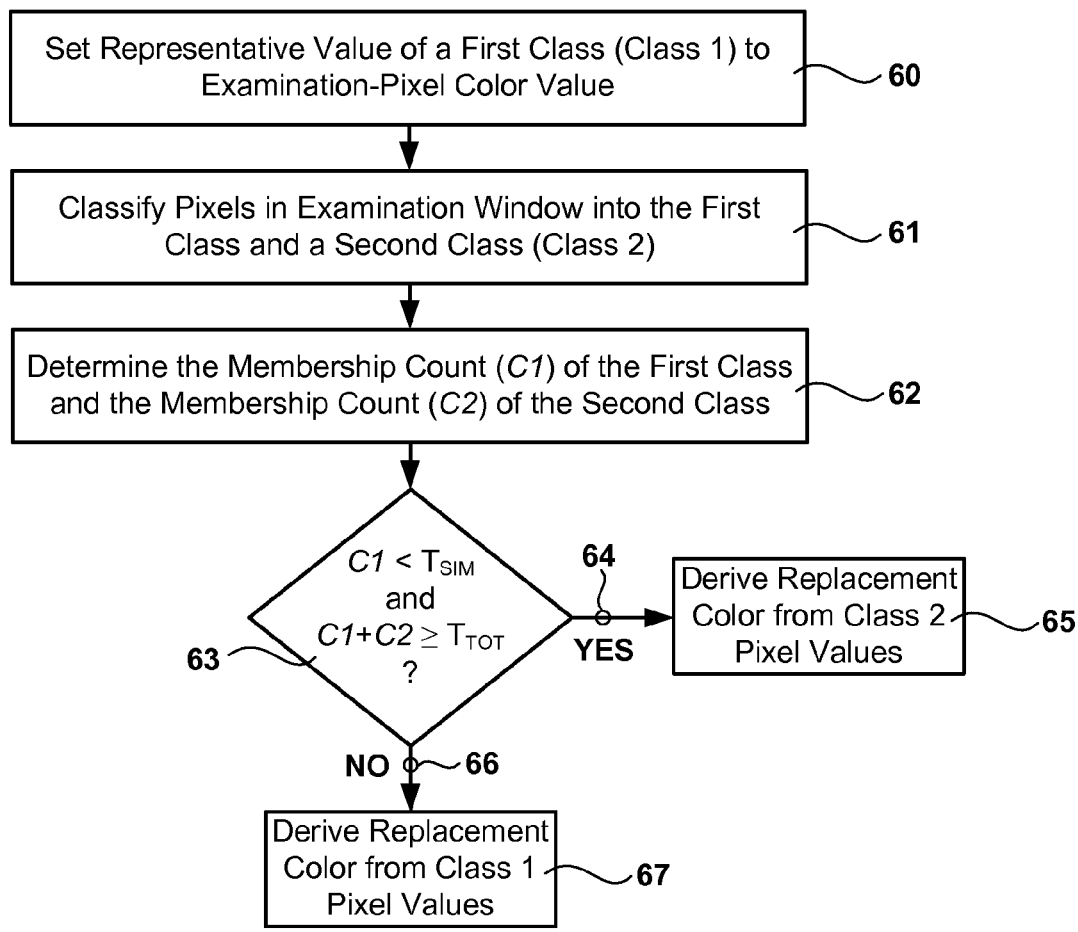
FIG. 6 is a chart showing embodiments of the present invention comprising derivation of a replacement color value from color values classified as dissimilar to a background-color estimate.

Some embodiments of the present invention may be described in relation to FIG. 6. In these embodiments, the representative color value for the first class may be set 60 to the color value of the pixel of interest. All pixels in the examination window may be examined, and pixels in the examination window classified 61 as belonging to the first class may comprise pixels with color values substantially similar to the color value of the pixel of interest. While pixels in the examination window classified 61 as belonging to the second class may comprise pixels with color values substantially dissimilar to the color value of the pixel of interest. Color classification 61 may comprise comparing the similarity measure to a predetermined threshold. The membership count in the each of the two classes may be determined 62. Based on the membership counts 63, the replacement color value for the pixel of interest may be determined from the color values of the pixels in the first class 67 or the second class 65.

In some embodiments of the present invention, the replacement color value may be derived from the color values of the pixels in the first class 67 when the condition (C1<Tsim and C1+C2≧Ttot), where C1 and C2 may be the membership counts of the first class and the second class, respectively, and Tsim may be a first threshold and Ttot may be a second threshold, may be satisfied 66. The replacement color value may be derived from the color values of the pixels in the second class 65 when this condition is not satisfied 64.

In some embodiments of the present invention, the replacement color value, $(\omega_A, \omega_B, \omega_C)$, may be derived from the color values of the pixels in the first class 67 according to:

$$\omega_A = \frac{1}{C1} \sum_{i \in class1} A_i, \omega_B = \frac{1}{C1} \sum_{i \in class1} B_i, \omega_C = \frac{1}{C1} \sum_{i \in class1} C_i.$$

The replace color value may be derived from the color values of the pixels in the second class 65 according to:

$$\omega_A = \frac{1}{C2} \sum_{i \in class2} A_i, \omega_B = \frac{1}{C2} \sum_{i \in class2} B_i, \omega_C = \frac{1}{C2} \sum_{i \in class2} C_i.$$

In alternative embodiments, the replacement color value may the class median color value.

In alternative embodiments of the present invention, the color value for all pixels within the first class in the examination window may be updated to the replacement color value.

In some embodiments of the present invention, a text pixel of interest may be removed from the text map if the number of text pixels within an examination window is below a threshold.

In some embodiments of the present invention, a sliding examination window may be used wherein the center text pixel color value may be refined. In alternative embodiments of the present invention, non-overlapping examination windows may be used wherein all of the color value of all of the text pixels within the examination window may be refined. In still alternative embodiments, partially overlapping examination windows may be used wherein only the color value of the text pixels within the non-overlapping part of the block may be refined.

In some embodiments of the present invention, a replacement value may be further refined based on a selection of the most recently determined refinement values. In alternative embodiments, the further refinement may be based on the refinement values in a causal neighborhood of the pixel of interest.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining a refinement color value for a pixel of interest in a digital image, said method comprising:
   in a computing system comprising a computing device, from a digital image comprising a first plurality of pixels, wherein each pixel in said first plurality of pixels comprises an associated color value, selecting a pixel of interest from said first plurality of pixels, said pixel of interest comprising a pixel-of-interest color value;
   in said computing system, separating said first plurality of pixels into a second plurality of pixels and a third plurality of pixels based on said pixel-of-interest color value;
   in said computing system, calculating a refinement color value based on said second plurality of pixels when said second plurality of pixels meets a quantity threshold;
   in said computing system, calculating said refinement color value based on said third plurality of pixels when said second plurality of pixels does not meet said quantity threshold; and
   in said computing system, assigning said refinement color value to said pixel of interest.

2. A method according to claim 1, wherein said pixel of interest is the center pixel in an examination window comprising said first plurality of pixels.

3. A method according to claim 1, wherein said first plurality of pixels are text pixels.

4. A method according to claim 3 further comprising assigning said refinement color value to said first plurality of pixels.

5. A method according to claim 1, wherein said second plurality of pixels comprises pixels from said first plurality of pixels with associated color values substantially similar to said pixel-of-interest color value.

6. A method according to claim 5 further comprising assigning said refinement color value to said second plurality of pixels.

7. A method according to claim 1, wherein said calculating a refinement color value based on said second plurality of pixels comprises a computation selected from the group consisting of a mean of the associated color values of the pixels in said second plurality of pixels, a median of the associated color values of the pixels in said second plurality of pixels, a weighted average of the associated color values of the pixels in said second plurality of pixels and a trimmed-mean of the associated color values of the pixels in said second plurality of pixels.

8. A method according to claim 1, wherein said calculating a refinement color value based on said third plurality of pixels comprises a computation selected from the group consisting of a mean of the associated color values of the pixels in said third plurality of pixels, a median of the associated color values of the pixels in said third plurality of pixels, a weighted average of the associated color values of the pixels in said second plurality of pixels and a trimmed-mean of the associated color values of the pixels in said third plurality of pixels.

9. A method according to claim 1, wherein said separating said first plurality of pixels into said second plurality of pixels and said third plurality of pixels based on said pixel-of-interest color value comprises:
   calculating a similarity measure between said pixel-of-interest color value and said associated color value of a second pixel from said first plurality of pixels; and
   associating said second pixel with said second plurality of pixels when said similarity measure meets a similarity criterion.

10. A method according to claim 9, wherein said similarity measure is a distance measure selected from the group consisting of $L_1$ norm, $L_2$ norm, Euclidean distance, city-block distance, weighted city-block distance and weighted Euclidean distance.

11. A system, embodied on a non-transitory computer-readable medium, for determining a refinement color value for a pixel of interest in a digital image, said system comprising:
   a pixel-of-interest selector for, from a digital image comprising a first plurality of pixels, wherein each pixel in said first plurality of pixels comprises an associated color value, selecting a pixel of interest from said first plurality of pixels, said pixel of interest comprising a pixel-of-interest color value;
   a classifier for separating said first plurality of pixels into a second plurality of pixels and a third plurality of pixels based on said pixel-of-interest color value;
   a refinement color calculator for:
      calculating a refinement color value based on said second plurality of pixels when said second plurality of pixels meets a quantity threshold; and
      calculating said refinement color value based on said third plurality of pixels when said second plurality of pixels does not meet said quantity threshold; and
   color-value assigner for assigning said refinement color value to said pixel of interest.

12. A method for determining a color value for a pixel of interest in a digital image, said method comprising:
   in a computing system comprising a computing device, from a digital image comprising a first plurality of pixels, wherein each pixel in said first plurality of pixels comprises an associated color value, selecting a pixel of interest from said first plurality of pixels, said pixel of interest comprising a pixel-of-interest color value;

in said computing system, identifying from said first plurality of pixels a second plurality of pixels, wherein said color values associated with said second plurality of pixels are substantially dissimilar to a background-color estimate;

in said computing system, calculating a refinement color value based on said second plurality of pixels; and in said computing system, assigning said refinement color value to said pixel of interest.

13. A method according to claim 12 further comprising calculating said background-color estimate.

14. A method according to claim 12 further comprising calculating said refinement color value based on said second plurality of pixels when said second plurality of pixels meets a quantity threshold.

15. A method according to claim 12 further comprising removing said pixel of interest from an associated text map when said pixel of interest color value is substantially similar to said background-color estimate.

16. A method according to claim 12, wherein said pixel of interest is the center pixel in an examination window comprising said first plurality of pixels.

17. A method according to claim 12, wherein said first plurality of pixels are text pixels.

18. A method according to claim 17 further comprising assigning said refinement color value to said first plurality of pixels.

19. A method according to claim 12 further comprising assigning said refinement color value to said second plurality of pixels.

20. A method according to claim 12, wherein said calculating a refinement color value based on said second plurality of pixels comprises a computation selected from the group consisting of a mean of the associated color values of the pixels in said second plurality of pixels, a median of the associated color values of the pixels in said second plurality of pixels, a weighted average of the associated color values of the pixels in said second plurality of pixels and a trimmed-mean of the associated color values of the pixels in said second plurality of pixels.

21. A method according to claim 12, wherein said refinement color value comprises a maximally dissimilar color value from said associated color values of said second plurality of pixels relative to said background-color estimate.

22. A method according to claim 12, wherein said identifying from said first plurality of pixels a second plurality of pixels comprises:

calculating a similarity measure between said background-color estimate and said associated color value of a second pixel from said first plurality of pixels; and associating said second pixel with said second plurality of pixels when said distance measure meets a dissimilarity criterion.

23. A method according to claim 22, wherein said similarity measure is a distance measure selected from the group consisting of $L_1$ norm, $L_2$ norm, Euclidean distance, city-block distance, weighted city-block distance and weighted Euclidean distance.

* * * * *